United States Patent [19]
Ezaki et al.

[11] Patent Number: 6,137,652
[45] Date of Patent: Oct. 24, 2000

[54] THIN FILM MAGNETIC HEAD WITH SEPARATED YOKE AND POLE TIPS

[75] Inventors: Joichiro Ezaki, Saku; Koichi Terunuma, Hohya, both of Japan

[73] Assignee: TDK Corporation, Tokyo, Japan

[21] Appl. No.: 09/151,602

[22] Filed: Sep. 11, 1998

[30] Foreign Application Priority Data

Sep. 12, 1997 [JP] Japan .................................. 9-249221

[51] Int. Cl.$^7$ .............................. G11B 5/187; G11B 5/39
[52] U.S. Cl. ............................................ 360/113; 360/126
[58] Field of Search ................................. 360/113, 126, 360/122

[56] References Cited

U.S. PATENT DOCUMENTS

| | | | |
|---|---|---|---|
| 5,438,747 | 8/1995 | Krounbi et al. | 360/113 |
| 5,452,164 | 9/1995 | Cole et al. | 360/113 |
| 5,473,491 | 12/1995 | Fujisawa et al. | 360/126 |
| 5,559,653 | 9/1996 | Shouji et al. | 360/126 |
| 5,600,519 | 2/1997 | Heim et al. | 360/126 |
| 5,649,351 | 7/1997 | Cole et al. | 29/603.14 |

FOREIGN PATENT DOCUMENTS

| | | |
|---|---|---|
| 7-225917 | 8/1995 | Japan . |
| 7-262519 | 10/1995 | Japan . |
| 8-249614 | 9/1996 | Japan . |

*Primary Examiner*—Jefferson Evans
*Attorney, Agent, or Firm*—Oblon, Spivak, McClelland, Maier & Neustadt, P.C.

[57] ABSTRACT

The present invention relates to an improvement in the write pole structure at a thin film magnetic head. At a write element, a gap film is provided between a first pole portion and a second pole portion. The first pole portion includes a second magnetic film adjacent the gap film and a first magnetic film adjacent the second magnetic film. The second pole portion includes a third magnetic film and a fourth magnetic film. The third magnetic film is provided adjacent to the gap film. The fourth magnetic film is provided adjacent to the third magnetic film. The surface of the fourth magnetic film facing opposite the medium is set within a width W21 of the third magnetic film in the direction of the tracks at its surface facing opposite the medium. In other words, the width W21 of the third magnetic film at the surface facing opposite the medium and a width W22 of the fourth magnetic film at its surface facing opposite the medium satisfy a relationship expressed as $W22 \leq W21$. Thus, unnecessary magnetic recording occurring due to leaked magnetic field is prevented.

13 Claims, 4 Drawing Sheets

THIN FILM MAGNETIC HEAD WITH SEPARATED YOKE AND POLE TIPS

BACKGROUND OF THE INVENTION

1. Field of the Invention

The present invention relates to a thin film magnetic head.

2. Discussion of Background

Most thin film magnetic heads employed in magnetic disk devices constituting computer storage apparatuses at present are the combined type that are provided with a thin film write element and a magnetoresistive (MR) read element. MR read elements, which are not dependent upon the speed relative to the magnetic disk, are capable of achieving a high degree of resolution. An MR read element includes a first shield film, a second shield film and an MR element. The first shield film and the second shield film are provided over a distance from each other via an appropriate nonmagnetic insulator and the MR element is provided between the first shield film and the second shield film.

The write element, which is constituted of an inductive electromagnetic transducer, is laminated on the MR read element. An inductive thin film magnetic transducer to constitute the write element is provided with a lower magnetic film which also functions as the second shield film for the MR read element, an upper yoke, a gap film, a coil film supported by an insulating film and the like.

The front ends of the lower magnetic film and the upper yoke are respectively constituted of a lower pole portion and an upper pole portion that face opposite each other over the gap film having a very small thickness, and a write operation is performed at the lower and upper pole portions. The lower magnetic film and an upper magnetic film are linked with each other so that their yoke completes a magnetic circuit at a back gap portion located on the opposite side from the lower and upper pole portions. The coil film is formed winding around the linking area of the yoke in a coil.

In order to support high recording density using this type of thin film magnetic head, the quantity of data stored per unit area of the magnetic disk (areal density) must be increased. An improvement in the areal density is achieved by improving the performance of the magnetic recording medium such as a magnetic disk and increasing the frequency at the write circuit as well as by improving the capability of the write element.

In one of the means for increasing the areal density by improving the capability of the write element, the gap length between the pole tips is reduced. However, since a reduction of the gap length leads to a reduction in the recording magnetic field intensity between the pole tips, there is naturally a limit to the degree to which the gap length can be reduced.

In another means for increasing the areal density, the number of data tracks that can be recorded on the magnetic disk is increased. The number of tracks that can be recorded on a magnetic disk is normally expressed as TPI (tracks per inch). The TPI capability of a write element may be enhanced by reducing the size of the head that determines the width of the data tracks. The head size is normally referred to as the head track width.

In the case of a conventional thin film magnetic head in the prior art described above, since the lower magnetic film at the write element is also employed as the second shield film of the MR read element, the width of the lower pole portion cannot be reduced, and consequently, a rather large side fringing magnetic field is generated during a recording operation. This magnetic field is caused by a leak of magnetic flux from the upper pole portion whose width is reduced to the lower magnetic film whose width is not reduced. Such a side fringing magnetic field restricts the lower limit of width that can be achieved and limits the degree to which the track density can be improved. In addition, it degrades the off-track performance when track data that have been written are read by the MR element.

As a means for eliminating the problem discussed above, Japanese Unexamined Patent Publication No. 262519/1995 and Japanese Unexamined Patent Publication No. 225917/1995 disclose a means for adjusting the width of the lower pole portion to the width of the upper pole portion through ion beam milling. However, the publications on the known art mentioned above only disclose the technology for improving the areal density by reducing the width of the pole tip at the write element and they do not disclose a structure of a thin film magnetic head that achieves an outstanding performance in recording data to a magnetic recording medium having a high degree of coercivity.

In addition, U.S. Pat. No. 5,600,519 discloses a structure provided with a tapered portion between the zero throat point and an expanded portion at the lower magnetic film and the upper magnetic film. However, the publication does not disclose how the write capability can be assured at the pole tips beyond the zero throat points.

Furthermore, U.S. Pat. No. 5,452,164 discloses a structure achieved by setting the width of the upper yoke to be larger than the width of the upper pole portion so that the two side surfaces of the upper yoke in the widthwise direction project out from the two side surface of the upper pole portion. However, this publication on the prior art technology does not disclose a means for preventing magnetic recording from occurring due to the magnetic flux leaking through the two side surfaces of the upper yoke in the widthwise direction.

SUMMARY OF THE INVENTION

It is an object of the present invention to provide a separate type thin film magnetic head in which yoke and pole tips are separated.

It is a further object of the present invention to provide a thin film magnetic head that is capable of achieving high density recording by preventing unnecessary magnetic recording occurring due to the leaked magnetic field to improve the track density in a separate type thin film magnetic head.

In order to achieve the objects described above, the thin film magnetic head according to the present invention is provided with at least one write element. In the write element, which includes a first pole portion, a second pole portion and a gap film, the gap film is provided between the first pole portion and the second pole portion. The second pole portion includes a third magnetic film and a fourth magnetic film. The third magnetic film is provided adjacent to the gap film. The fourth magnetic film is adjacent to the third magnetic film, and its surface that faces opposite the medium is set at the surface, and within the width of the third magnetic film in the direction of the tracks facing opposite the medium.

As described above, in the thin film magnetic head according to the present invention, the third magnetic film of the second pole portion is adjacent to the gap film. Consequently, by using the third magnetic film as a pole tip and setting the head size that determines the width of the data tracks to very small dimensions determined by the width of the third magnetic film to improve the TPI capability, high density recording is achieved.

At the same time, the fourth magnetic film included in the second pole portion is provided adjacent to the third magnetic film. By using the fourth magnetic film as a yoke, the magnetic flux which is required for a write operation can be supplied to the third magnetic film constituting the pole tip from the fourth magnetic film. In other words, according to the present invention, a separate type thin film magnetic head in which the pole tips are separated from the yoke can be achieved.

Since the surface of the fourth magnetic film facing opposite the medium is set at the surface and within the width of the third magnetic film in the direction of the tracks facing opposite the medium, the width W21 of the surface of the third magnetic film facing opposite the medium and the width W22 of the surface of the fourth magnetic film facing opposite the medium always satisfy a relationship expressed as $W22 \leq W21$. When this relationship is satisfied, the magnetic flux leaking from the two sides in the direction of the width of the surface facing opposite the medium at the fourth magnetic film that supplies magnetic flux to the third magnetic film to prevent magnetic recording of data onto the magnetic recording medium occurring due to the leaked magnetic field. Thus, the track density can be increased to achieve high density recording.

The present invention further discloses a width ratio of the width W21 and the width W22 and the shape of the fourth magnetic film, with which the write capability (the overwrite characteristics) can be assured and magnetic recording occurring due to the leaked magnetic field leaking from the fourth magnetic film can be prevented.

In one specific mode of the thin film magnetic head according to the present invention, the first pole portion includes a first magnetic film and a second magnetic film, with the second magnetic film provided adjacent to the gap film. The first magnetic film is provided adjacent to the second magnetic film. By combining this structure for the first pole portion and the structure of the second pole portion described earlier, a structure which is achieved by providing the first magnetic film, the second magnetic film, the gap film, the third magnetic film and the fourth magnetic film adjacent to each other in this order is realized. By adopting this structure, in which the second magnetic film and the third magnetic film among the four magnetic films, i.e., the first magnetic film to the fourth magnetic film, are employed as pole tips, the head size which determines the width of the data tracks can be set very small, determined by the widths of the second magnetic film and the third magnetic film to increase the TPI capability so that high density recording can be achieved.

In addition, the first magnetic film and the fourth magnetic film may be extended toward the rear from the pole portions to constitute a yoke in the portions extended toward the rear. In this structure, the magnetic flux required for a write operation is supplied from the first magnetic film and the fourth magnetic film constituting the yoke to the second magnetic film and the third magnetic film constituting the pole tips.

The thin film magnetic head according to the present invention normally includes an MR read element. In the MR read element, which includes a first shield film, a second shield film and an MR element, the first shield film and the second shield film are provided over a distance from each other with the MR element located between the first shield film and the second shield film.

The write element is laminated on the MR read element. In this structure, the second shield film also functions as the first magnetic film of the write element to achieve a reduction in thickness.

DETAILED DESCRIPTION OF THE PREFERRED EMBODIMENT

Figure 1:
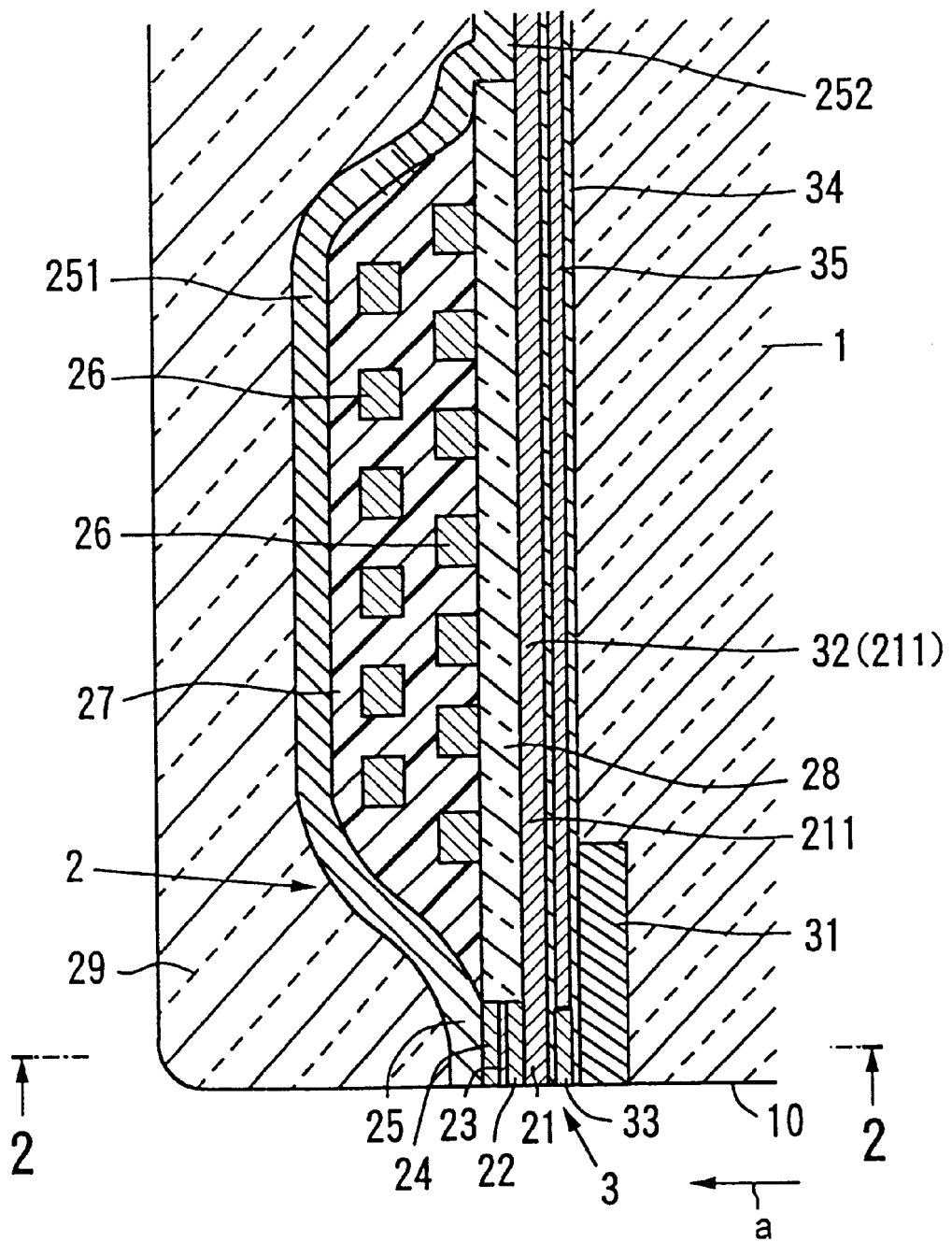
FIG. 1 is a sectional view of the magnetic head according to the present invention.
Figure 2:
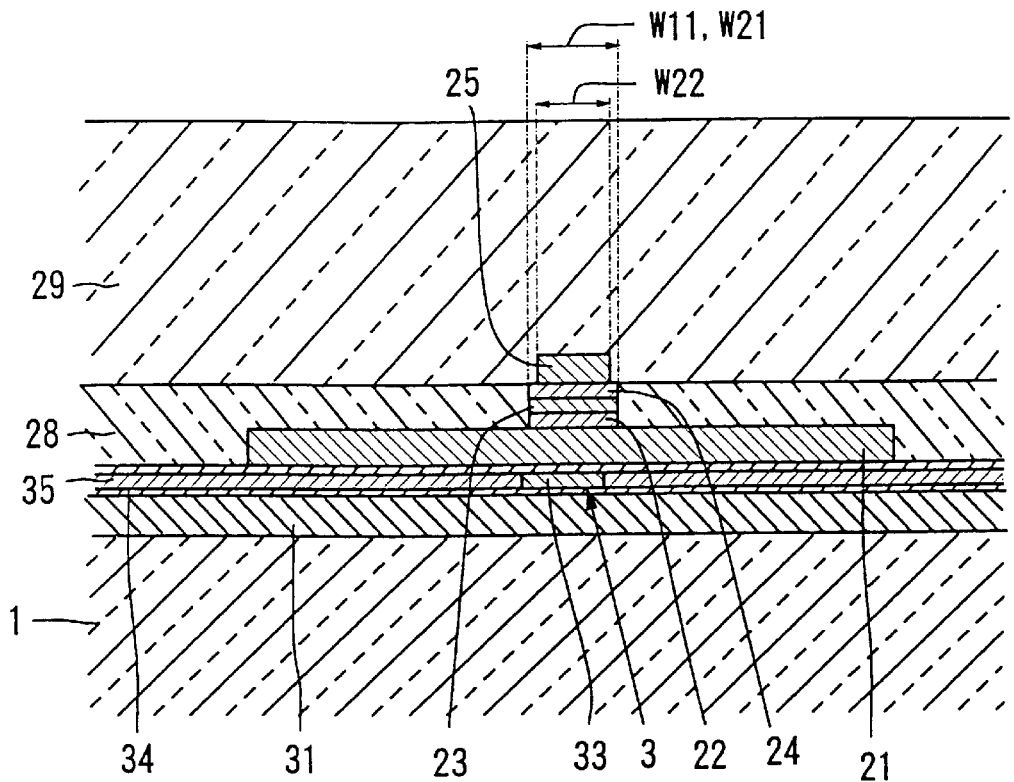
FIG. 2 is a sectional view taken along line 2—2 of FIG. 1.
Figure 3:
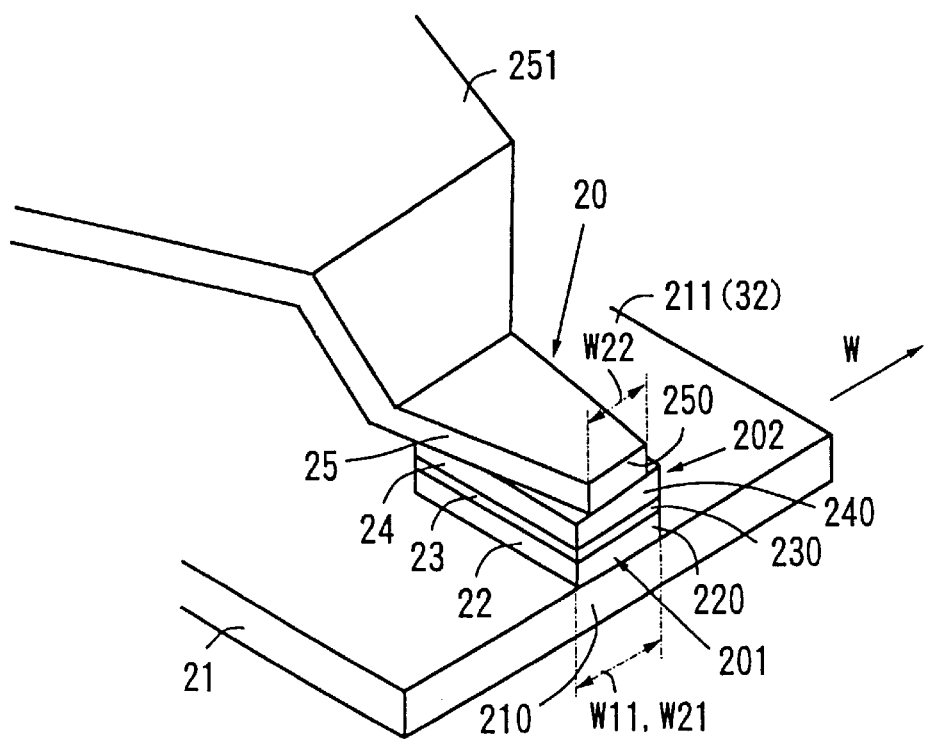
FIG. 3 is an enlarged perspective illustrating the pole area of the thin film magnetic head shown in FIGS. 1 and 2.

In FIGS. 1 to 3, a combined type thin film magnetic head provided with both a write element 2 and an MR read element 3 is illustrated. In the figures, the dimensions are exaggerated. The write element 2 and the MR read element 3 are laminated on a base body 1 which is employed as a slider, with the read/write area located at an air bearing surface 10 of the base body 1. The arrow "a" indicates the direction in which the magnetic recording medium rotates (the direction of airflow).

The write element 2, which is constituted of an inductive thin film magnetic transducer, is laminated on the MR read element 3. The write element 2 is provided with a pole portion 20.

As FIG. 3 clearly illustrates, the pole portion 20 includes a second pole portion 202, a first pole portion 201 and a gap film 23. The gap film 23 is provided between the second pole portion 202 and the first pole portion 201. The second pole portion 202 includes a third magnetic film 24 and a fourth magnetic film 25.

The third magnetic film 24 is laminated on and adjacent to one surface of the gap film 23. As a result, the third magnetic film 24 may be employed as a pole tip to set the head size, which determines the width of the data tracks, very small, determined by the width W21 of the third magnetic film 24 so that the TPI capability can be improved to achieve high density recording.

At the same time, the fourth magnetic film 25 constituting the second pole portion 202 is laminated on one surface of the third magnetic film 24. Since the fourth magnetic film 25, which is separate from the third magnetic film 24 to constitute the pole tip is provided in this manner, the fourth magnetic film 25 can be employed as a yoke so that the magnetic flux required for write operations can be supplied from the fourth magnetic film 25 to the third magnetic film 24 constituting the pole tip. In other words, according to the present invention, a separate type thin film magnetic head in which pole tips are provided separate from the yoke, can be provided.

A surface 250 of the fourth magnetic film 25 that faces opposite the medium is located within the width W21 in the direction of the tracks at a surface 240 of the third magnetic film 24 facing opposite the medium. Namely, the width W21 at the surface 240 of the third magnetic film 24 facing opposite the medium and the width W22 of the surface 250 at the fourth magnetic film 25 facing opposite the medium satisfy the relationship expressed as W22≦W21. By ensuring that this relationship is satisfied, the magnetic flux leaking from the two sides of the surface 250 facing opposite the medium in its widthwise direction at the fourth magnetic film 25 which supplies magnetic flux to the third magnetic film 24 is suppressed, to prevent magnetic recording onto the magnetic recording medium occurring due to the leaked magnetic field. Thus, the track density can be increased to achieve high density recording.

In the embodiment, the first pole portion 201 includes a first magnetic film 21 and a second magnetic film 22 which lies adjacent to the gap film 23. The first magnetic film 21, on the other hand, is provided adjacent to the second magnetic film 22. By combining the structure for the first pole portion 201 and the structure of the second pole portion 202 described earlier, a structure achieved by providing the first magnetic film 21, the second magnetic film 22, the gap film 23, the third magnetic film 24 and the fourth magnetic film 25 adjacent to each other in this order, is obtained. By adopting this structure in which the second magnetic film 22 and the third magnetic film 24 are employed as pole tips, the head size, which determines the width of the data tracks, can be set very small, determined by the widths W11 and W21 of the second magnetic film 22 and the third magnetic film 24, so that the TPI capability is increased to achieve high density recording.

The first magnetic film 21 and the fourth magnetic film 25 are extended toward the rear from the pole portion 20 with a yoke constituted of the portions extending toward the rear and the yoke linked to each other. This structure ensures that the magnetic flux required for a write operation is supplied from the first magnetic film 21 and the fourth magnetic film 25 that constitute the yoke to the second magnetic film 22 and the third magnetic film 24 that constitute the pole tips.

Normally, the first magnetic film 21 to the fourth magnetic film 25 may be constituted of Permalloy. The gap film 23 may be constituted of a metal oxide such as AlO, SiO or the like or a nitride such as AlN, BN, SiN or the like. Alternatively, the gap film 23 may be constituted of a conductive nonmagnetic material such as Au, Cu or NiP.

Figure 4:
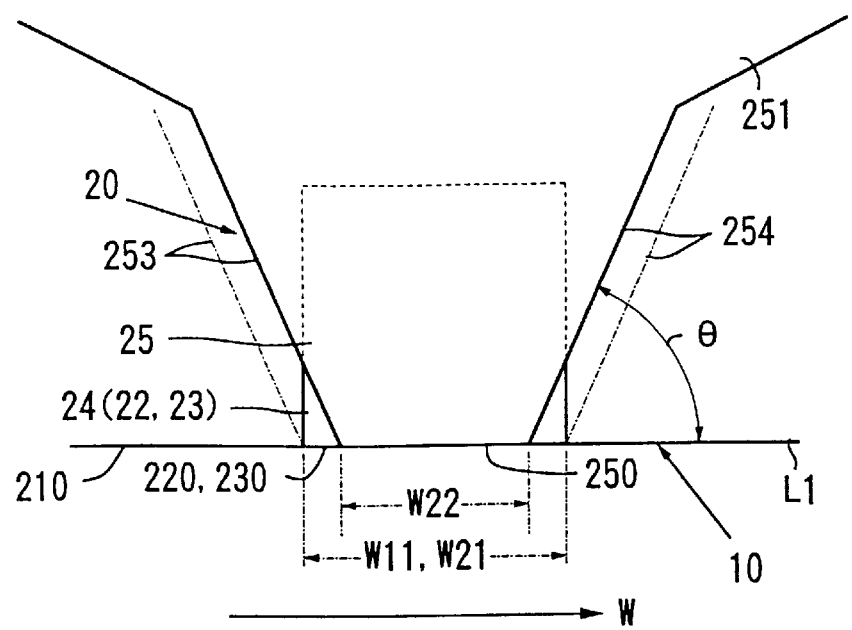
FIG. 4 is an enlarged plan view illustrating the pole area of the thin film magnetic head shown in FIGS. 1 and 2.

In the embodiment, the width of the fourth magnetic film 25 gradually increases from its surface 250 facing opposite the medium toward the rear. This structure allows the write magnetic flux to concentrate from 25 to 24 to maintain the write capability without causing magnetic recording to occur due to the magnetic field leaking from the fourth magnetic film 25. In the structure, the fourth magnetic film 25 should expand as illustrated in FIG. 4 so that the angle θ formed by a line L1 parallel to the surface 250 facing opposite the medium and the two side surfaces 253 located in the direction of the width W satisfies $20° \leq θ \leq 90°$. It is even more desirable to set the range to $30° \leq θ \leq 90°$.

If the angle θ is smaller than 20°, magnetic saturation occurs at the third magnetic film 24 due to the magnetic flux concentrating from 25 to 24, which induces recording demagnetization. If the angle θ exceeds 90°, sufficient magnetic flux cannot be supplied from the fourth magnetic film 25 to the third magnetic film 24 and, as a result, the write capability is reduced. Since the present invention requires the surface 250 of the fourth magnetic film 25 facing opposite the medium to be set within the width W21 of the third magnetic film 24, the two ends of the surface 250 of the fourth magnetic film 25 facing opposite the medium in the direction of the width W are restricted to be set at the positions at the two corners of the third magnetic film 24 even when the fourth magnetic film 25 expands to the maximum degree.

The width W21 of the third magnetic film 24 should be set less than 2.0 μm to improve the track density. Such a small pole width can only be realized by constituting the thin film magnetic head according to the present invention as a separated magnetic pole type and is a great advantage of the separated magnetic pole type. It is difficult to achieve such a minute pole width in a thin film magnetic head in the prior art of a non-separated magnetic pole type.

The surfaces 210, 220, 230, 240 and 250 all facing opposite the medium, belonging to the first magnetic film 21, the second magnetic film 22, the gap film 23, the third magnetic film 24 and the fourth magnetic film 25 respectively, constitute a single flat surface. The flat surface constituted of the surfaces 210 to 250 facing opposite the medium constitutes a portion of the ABS surface 10. The second magnetic film 22, the gap film 23 and the third magnetic film 24 constitute a rear wall surface which is essentially a single flat surface on the side opposite from the surfaces 220 to 240 facing opposite the medium. This rear wall surface is essentially parallel to the ABS surface 10 constituted by the surfaces facing opposite the medium.

Figure 5:
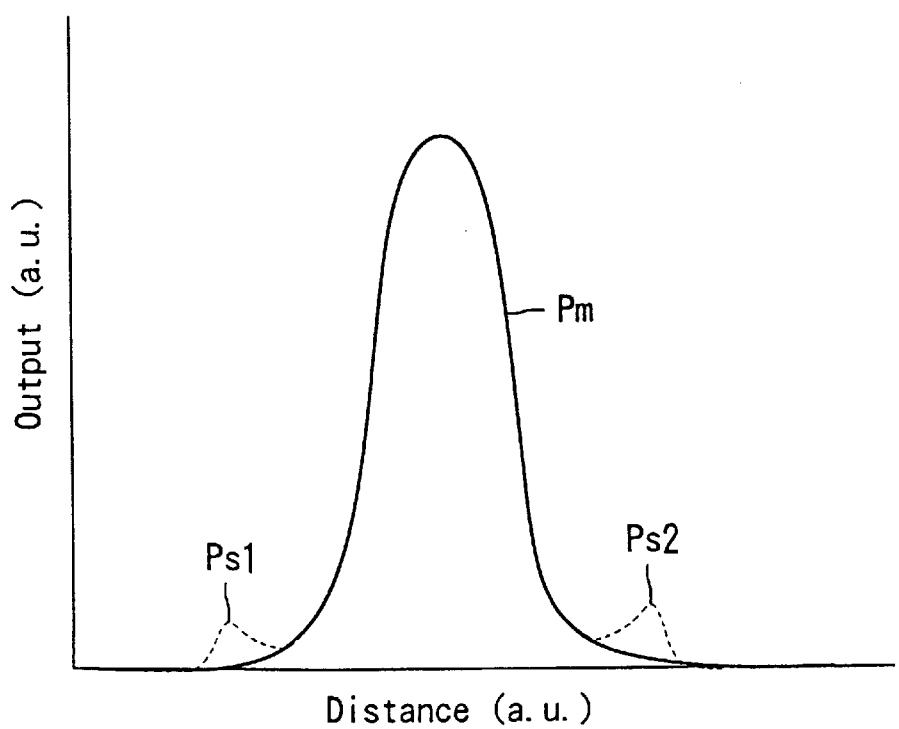
FIG. 5 illustrates the reproduction output characteristics of the thin film magnetic head.

Next, advantages achieved by the thin film magnetic head according to the present invention are explained in reference to specific test data. FIG. 5 presents reproduction waveform data obtained by reading out magnetic recording written by using the thin film magnetic head. The thin film magnetic head according to the present invention employed to obtain these data is structured as follows:

width W11 and width W21: 1.3 μm;

width W22: 1.1 μm;

angle θ: 45°;

gap created by gap film 23: 0.3 μm;

first magnetic film 21: film thickness; 2.5 μm, plated NiFe film;

second magnetic film 22: film thickness; 0.5 μm, plated NiFe film;

third magnetic film 24: film thickness; 0.5 μm, plated NiFe film;

fourth magnetic film 25: film thickness; 2.5 μm, plated NiFe film;

coil film 26: 10 turns.

Using the thin film magnetic head structured as described above, a recording current of 40 mA 0-p was supplied to the coil film 26 to perform magnetic recording to a magnetic recording medium with a coercivity Hc of 2300 (Oe) and a residual magnetization t.Br of 80 G μm. Then, reproduction was performed using a reproduction head having a magnetic anisotropic magnetoresistive element (AMR element) with a reproduction track width set at 1.0 μm.

For purposes of comparison, magnetic recording was performed using a thin film magnetic head in the prior art and reproduction was performed using the reproduction head described above provided with an AMR element. The thin film magnetic head in the prior art employed in the test is structured identically to the thin film magnetic head according to the present invention except that the width W22 was set at 2.0 m and the angle θ was set at 90°.

In FIG. 5, the characteristics Pm (main pulse) indicated by the solid line represent the reproduction waveform achieved by performing recording with the thin film magnetic head according to the present invention, whereas the characteristics that include the characteristics Pm indicated by the solid line and Ps1 an Ps2 (side pulses) indicated by the dotted lines represents the reproduction waveform achieved by the thin film magnetic head in the prior art.

In reference to FIG. 5, when performing recording with the thin film magnetic head in the prior art, the side pulses Ps1 and Ps2 appear in the reproduction waveform in addition to the main pulse Pm. In contrast, only the main pulse Pm manifests itself in the recording performed with the thin film magnetic head according to the present invention, and the side pulses Ps1 and Ps2 caused by magnetic recording occurring due to the leaked magnetic field are not read.

Figure 6:
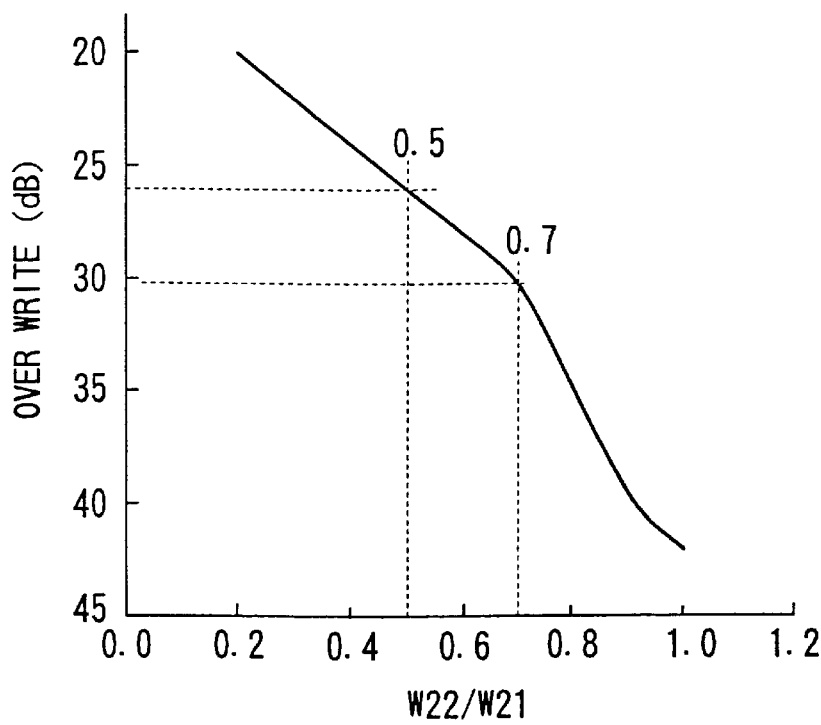
FIG. 6 presents data illustrating the relationship between the width ratio (W22/W21) and the overwrite characteristics.

FIG. 6 presents data that illustrate the relationship between the width ratio (W22/W21) and the overwrite characteristics. The thin film magnetic head used in the test is the thin film magnetic head according to the present invention which was employed to obtain the data presented in FIG. 5. However, the width ratio (W22/W21) was varied by changing the width W22 while setting the width W11 and the width W21 at a fixed value of 1.3 $\mu$m.

In reference to FIG. 6, overwrite characteristics equal to or exceeding 26 (dB) were achieved within the range of $0.5 \leq W22/W21 \leq 1.0$. In particular, overwrite characteristics equal to or exceeding 30 (dB) were achieved in the range of $0.7 \leq W22/W21 \leq 1.0$, and furthermore, in this range, a marked rate of improvement in the overwrite characteristics relative to the change in (W22/W21) is observed.

Under normal circumstances, in the field of magnetic recording, overwrite characteristics of at least 26 (dB) and preferably overwrite characteristics equal to or exceeding 30 (dB) are required. In reference to FIG. 6, it is obvious that this requirement can be satisfied by setting the width ratio within the range of $0.5 \leq W22/W21 \leq 1.0$, and more preferably, within the range of $0.7 \leq W22/W21 \leq 1.0$. Particularly, since a significant increase rate of the overwrite characteristics relative to the change in (W22/W21) is achieved within the range of $0.7 \leq W22/W21 \leq 1.0$, a marked improvement in the overwrite characteristics is realized.

Figure 7:
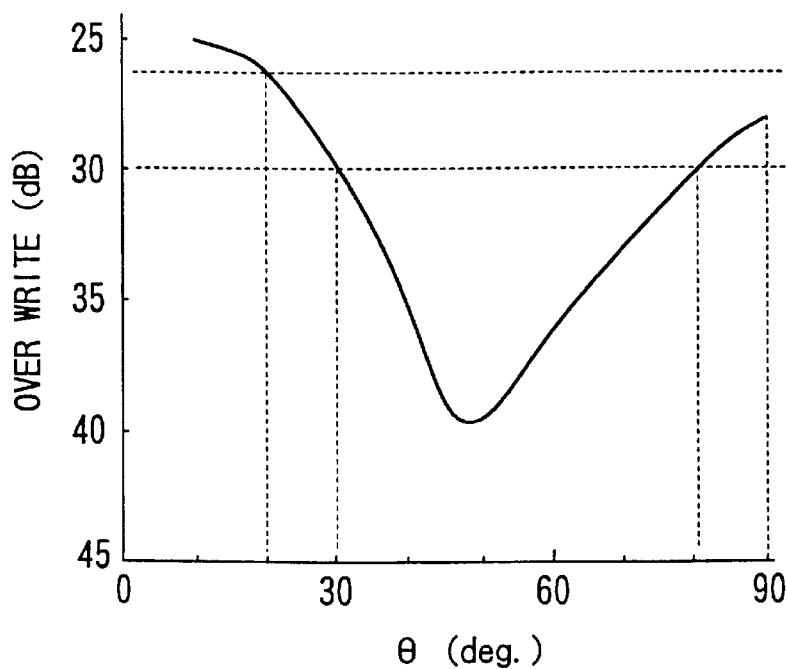
FIG. 7 presents data illustrating the relationship between the angle θ and the overwrite characteristics.

FIG. 7 presents data that illustrate the relationship between the angle $\theta$ and the overwrite characteristics. The thin film magnetic head employed in the test is the thin film magnetic head according to the present invention that was employed to obtain the data presented in FIG. 5. However, the width W11 and the width W21 were set at 1.3 $\mu$m and the width W22 was set at 1.1 $\mu$m to measure the overwrite characteristics while varying the angle $\theta$.

As already mentioned, it is required in the area of magnetic recording that overwrite characteristics of at least 26 (dB); and even more preferably overwrite characteristics of at least 30 (dB), be achieved. In reference to FIG. 7, it is obvious that this requirement is satisfied by setting the angle $\theta$ within the range of $20° \leq \theta \leq 90°$; and more preferably within the range of $30° \leq \theta \leq 90°$.

The area around the first magnetic film 21, the third magnetic film 24 and the gap film 23 is filled by a nonmagnetic insulating film 28. The upper surface of the nonmagnetic insulating film 28 is flattened to form a flat surface that is essentially the same surface as the surface of the third magnetic film 24. The nonmagnetic insulating film 28 may be constituted of AlO, SiO or the like. Reference number 29 indicates a protective film which covers the entire structure and is constituted of AlO, SiO or the like.

The second magnetic film 22 and the third magnetic film 24 are normally constituted of Permalloy. In another mode, at least either the second magnetic film 22 or the third magnetic film 24 may be constituted of a material having higher saturation magnetic flux density compared to that of Permalloy. This structure will achieve satisfactory recording performance even with a magnetic recording medium having a high coercivity. A high saturation magnetic flux density material having a higher saturation magnetic flux density compared to that of Permalloy should be selected for this purpose. For instance, at least one substance selected from Fe—Co, Fe—M and Fe—Co—M may be used. In this context, M represents at least one substance selected from N, C, B, Si, Al, Ti, Zr, Hf, Mo, Ta and Nb (all chemical symbols). The second magnetic film 22 and the third magnetic film 24 both may be constituted of the high saturation magnetic flux density material described above or only either one of them may be constituted of the high saturation magnetic flux density material.

Alternatively, at least either the first magnetic film 21 or the fourth magnetic film 25 may be constituted of a material having a higher resistivity compared to that of Permalloy. This structure will reduce the eddy current loss compared to a structure employing Permalloy, when the frequency is increased at the write circuit. Specific examples of the high resistivity material include at least one substance selected from Fe—Co amorphous, Fe—M—N, Fe—M—O, Fe—Co—M—N, Fe—Co—M —O and Fe—Co—N. In this context, M represents at least one substance selected from B, Si, Al, Ti, Zr, Hf, Mo, Ta and Nb (all chemical symbols). Both the first magnetic film 21 and the fourth magnetic film 25 may be constituted of the high resistivity material described above or only either one of them may be constituted of the high resistivity material.

The MR read element 3 includes a first shield film 31, a second shield film 32, an MR element 33 and a lead conductor film 35. The first shield film 31 and the second shield film 32 are provided over a distance from each other, with the MR element 33 provided between the first shield film 31 and the second shield film 32. The second shield film 32 constitutes the first magnetic film 21 of the write element 2. A nonmagnetic insulating film 34 is provided between the first shield film 31 and the second shield film 32, with the MR element 33 and the lead conductor film 35 provided inside the nonmagnetic insulating film 34.

The write element 2 is laminated onto the MR read element 3. In this structure, the second shield film 32 also functions as the first magnetic film 21 of the write element 2. Since the second magnetic film 22 projects out over the first magnetic film 21, the width W11 of the second magnetic film 22 can be reduced to a great degree while maintaining the width of the second shield film 32 to dimensions required to protect the MR read element 3.

According to the present invention, various types of inductive thin film magnetic transducers that have been proposed to date and those that will be proposed in the future may be employed to constitute the write element 2. In addition, various types of read elements including those using a magnetic anisotropic magnetoresistive film such as a Permalloy film and those utilizing the giant magnetoresistance effect by employing a spin valve film, a tunnel junction effect film or the like, may be used to constitute the MR read element 3. The write element 2 and the MR read element 3 are mounted on a slider. The slider may be provided with one or more rails, or a slider without rails may be employed.

While the invention has been particularly shown and described with respect to a preferred embodiment thereof by referring to the attached drawings, the present invention is not limited to the example and it will be understood by those skilled in the art that various changes in form and detail may be made therein without departing from the spirit, scope and teaching of the invention.

What is claimed is:

1. A thin film magnetic head comprising:
    at least one write element having a second pole portion, a first pole portion and a gap film;
    said gap film being provided between said first pole portion and said second pole portion; and
    said second pole portion having a third magnetic film provided adjacent to said gap film and a fourth magnetic film provided adjacent to said third magnetic film, with a surface of said fourth magnetic film facing opposite a medium set within a width in the direction of tracks at a surface of said third magnetic film facing opposite said medium;
    wherein a relationship expressed as $W22 \leq W21$ with $W21$ representing a width of said third magnetic film at said surface facing opposite said medium and $W22$ representing a width of said fourth magnetic film at said surface facing opposite said medium is satisfied.

2. The thin film magnetic head of claim 1 wherein said first pole portion includes a second magnetic film provided adjacent to said gap film and a first magnetic film provided adjacent to said second magnetic film.

3. The thin film magnetic head of claim 2 wherein said magnetic head includes a portion extending rearward from said first pole portion with said portion constituting a yoke; and
    said fourth magnetic film includes a portion extending rearward from said second pole portion, with said portion constituting a yoke, and the rear of said yoke linked to said yoke of said first magnetic film, said fourth magnetic film linked to said yoke of said first magnetic film at the rear of said yoke of said fourth magnetic film.

4. The thin film magnetic head of claim 2 wherein surfaces of said first magnetic film, said second magnetic film, said gap film, said third magnetic film and said fourth magnetic film opposite said medium, essentially constitute a single flat surface.

5. The thin film magnetic head of claim 2 wherein said second magnetic film, said gap film and said third magnetic film constitute a rear wall surface which is essentially a single flat surface on a side opposite from said surfaces facing opposite said medium; and
    said rear wall surface is essentially parallel to said flat surface constituted of said surfaces facing opposite said medium.

6. The thin film magnetic head of claim 1 wherein said width $W21$ and said width $W22$ satisfy a relationship expressed as $0.5 \leq W22/W21 \leq 1.0$.

7. The thin film magnetic head of claim 1 wherein said width $W21$ and said width $W22$ satisfy a relationship expressed as $0.7 \leq W22/W21$.

8. The thin film magnetic head of claim 1 wherein said width $W21$ is less than 2.0 μm.

9. The thin film magnetic head of claim 1 wherein a width of said fourth magnetic film gradually increases rearward from said surface facing opposite said medium.

10. The thin film magnetic head of claim 9 wherein an angle θ formed by a line parallel to said surface facing opposite said medium and two side surfaces located in the direction of said width at said fourth magnetic film satisfies $20° \leq \theta \leq 90°$.

11. The thin film magnetic head of claim 10 wherein said angle θ satisfies $30° \leq \theta \leq 90°$.

12. The thin film magnetic head of claim 1 further provided with an MR read element.

13. The thin film magnetic head of claim 12 wherein said MR read element includes a first shield film, a second shield film and an MR element, with said MR element provided between said first shield film and said second shield film and said second shield film constituting said first magnetic film of said write element.

* * * * *